United States Patent [19]

Fassauer

[11] Patent Number: 4,500,145

[45] Date of Patent: Feb. 19, 1985

[54] APPARATUS FOR STORING AND SERVING PERISHABLE FOOD PRODUCTS

[76] Inventor: Arthur L. Fassauer, 420 Forest La., Canyon, Tex. 79015

[21] Appl. No.: 459,768

[22] Filed: Jan. 21, 1983

[51] Int. Cl.³ ............................................. A47F 1/06
[52] U.S. Cl. ...................... 312/61; 312/71; 312/272; 312/296; 312/312
[58] Field of Search ............... 312/50, 60, 61, 71, 312/35, 42, 272, 312, 31.1, 296; 221/266; 426/115, 124, 128

[56] References Cited

U.S. PATENT DOCUMENTS

| 104,523 | 2/1984 | Wiley | 312/312 |
|---|---|---|---|
| 1,854,756 | 4/1932 | Muller | 312/272 |
| 2,157,476 | 5/1939 | Brodesser | 426/115 |
| 2,270,935 | 1/1942 | Doering | 426/115 |
| 2,493,976 | 1/1950 | Klemm et al. | 312/312 |
| 2,627,445 | 2/1953 | Lyon | 312/272 |
| 2,876,930 | 3/1959 | Will | 221/260 |
| 3,227,374 | 1/1966 | Valentine | 312/31.1 |
| 3,249,250 | 3/1966 | Mckee | 426/115 |
| 3,926,001 | 12/1975 | Webb | 312/71 |
| 4,320,932 | 3/1982 | Giffin | 312/71 |

Primary Examiner—William E. Lyddane
Assistant Examiner—Joseph Falk
Attorney, Agent, or Firm—Jerry W. Mills; Gregory M. Howison; Nina Medlock

[57] ABSTRACT

A food dispenser includes a housing (12) with a receiving chamber (14) and an auxiliary chamber (16) on the interior thereof. A reciprocating platform (28) is disposed in the receiving chamber (14) for reciprocation therein. A cord (30) is wrapped about the platform (28) and having one end thereof attached to a point (32) on the rim (24) of the housing and the other end thereof wound about a pulley (36) for rotation therewith. The pulley (36) is attached to a shaft (38) in the auxiliary chamber (16) which is rotatable with a knob (40). A lid (18) is mounted on the housing (12) with a hinge (20) to provide an airtight seal thereto. Food disposed in the receiving chamber (14) can be dispensed by raising the platform (28) and then stored by closing the lid on the remaining food products therein.

11 Claims, 9 Drawing Figures

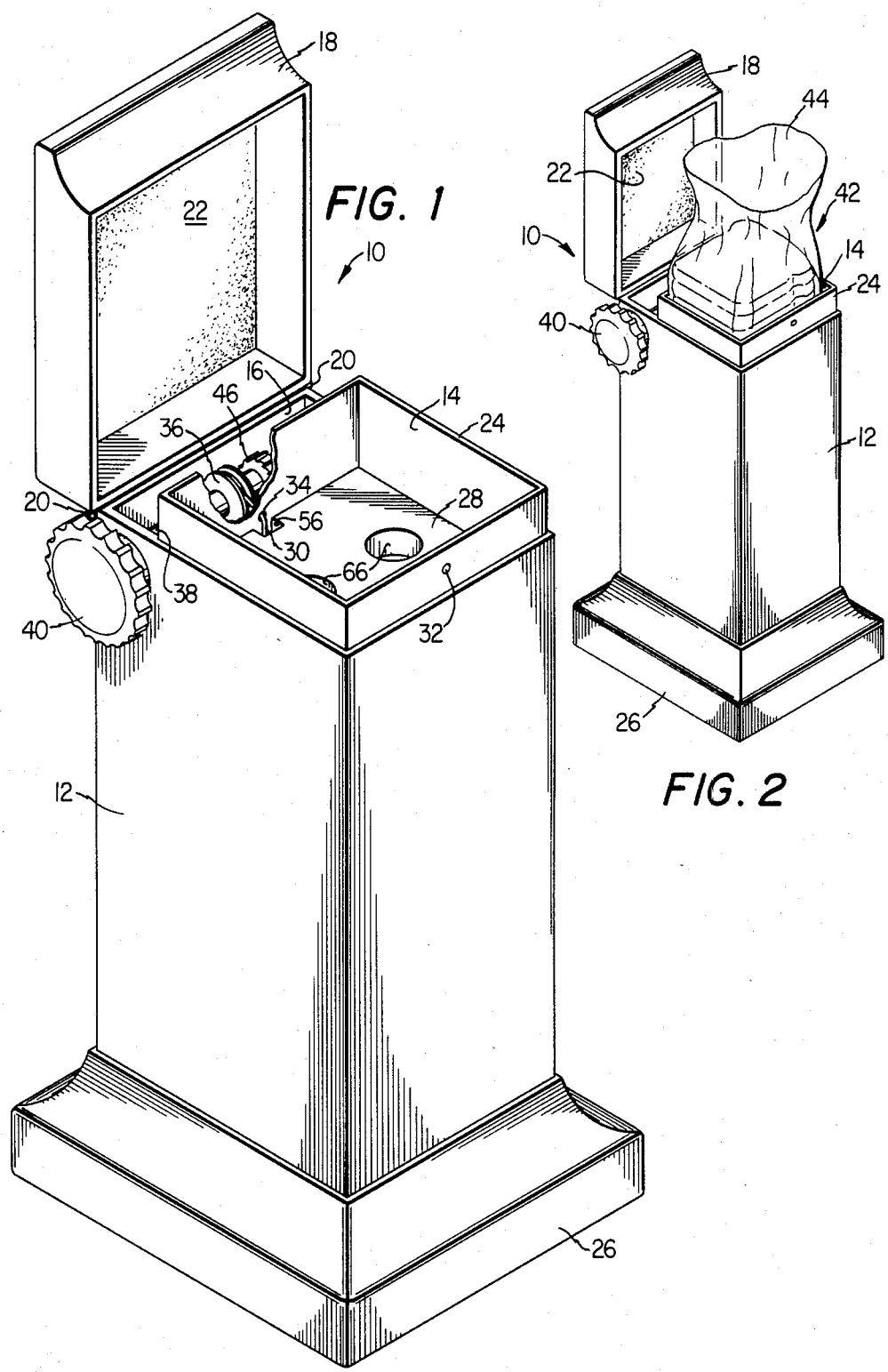

APPARATUS FOR STORING AND SERVING PERISHABLE FOOD PRODUCTS

TECHNICAL FIELD

The present invention pertains in general to a combination storage and serving container and, more particularly, to an airtight storage container and dispenser for perishable food products such as bread and butter.

BACKGROUND OF THE INVENTION

The storage of perishable products such as bread and butter normally requires some type of covering to prevent first a decrease in moisture in the food products, i.e. stale bread, and second, bacterial growth therein, i.e. bread mold. Such things as a bread box or butter dish have been utilized in the past. In addition, a housewife might also put bread in a cool area such as a refrigerator to reduce evaporation of moisture in the food product and decrease bacterial activity. Bread manufacturers have also helped the situation by placing a plastic bag over the bread which, when a number of slices are removed, the remaining slices of bread can be tightly wrapped with a small wire tie to reduce the air volume therein and provide a semi-airtight container for the bread. Since there is very little air remaining in the bag, evaporation can only take place until this air is saturated, thus reducing the rate of evaporation which increases the amount of time bread can be stored without going stale. This reduction in available air volume also reduces the activity of aerobic bacteria and spores that may be present in bread.

Although present containers facilitate a decrease in air volume surrounding an open package of bread, these types of packages or containers are very cumbersome to use. In view of these disadvantages, there exists a need for a container that reduces the volume of air remaining around the stored perishable food products while allowing ready access to the food products.

SUMMARY OF THE INVENTION

The invention described and claimed herein comprises an apparatus for storing and serving perishable food products. The apparatus includes a lower housing having a receptacle therein for receiving and containing the food products with an opening in one end thereof. A lid is disposed on the open end of the lower housing to form a semi-airtight container to retain moisture in the food products. A platform is disposed in the receptacle of the housing for movement therein to define a variable receiving volume for receiving the food products. The platform is urged along an axis that is perpendicular to the plane of the opening to increase and decrease the receiving volume to selectively advance the food products out of the receiving volume. This allows the air volume surrounding the food products to be minimized at all times.

In another embodiment of the present invention, a nylon cord is attached at one point on the opening of the lower housing and disposed along the vertical side of the receptacle to wrap around the platform and extend upward along the opposite side of the receptacle to attach to a rotatable shaft. The cord is wound about the shaft such that rotation of the shaft decreases the effective length of the cord and urges the platform along the longitudinal axis of the lower housing.

In yet another embodiment of the present invention, a method is provided to urge the stored food product, such as bread, along the longitudinal axis of the lower housing. The food product is then compressed against the closed lid to further reduce air trapped within the food. In this manner, moisture can be reduced.

In a further embodiment of the present invention, a sponge is disposed in an auxiliary chamber that is adjacent the variable receiving volume. This sponge, when dampened, provides a source of humidity for the airtight container to maintain a high level of moisture in the air surrounding the perishable food products. Other aspects of the present invention will become apparent hereinafter.

BRIEF DESCRIPTION OF THE DRAWINGS

For a more complete understanding of the present invention and the advantages thereof, reference is now made to the following description taken in conjunction with the accompanying Drawings in which:

FIG. 1 illustrates a perspective view of the food dispenser of the present invention with the lid open;

FIG. 2 illustrates a perspective view of the food dispenser of FIG. 1 with bread contained therein;

DETAILED DESCRIPTION OF THE INVENTION

Figure 3:
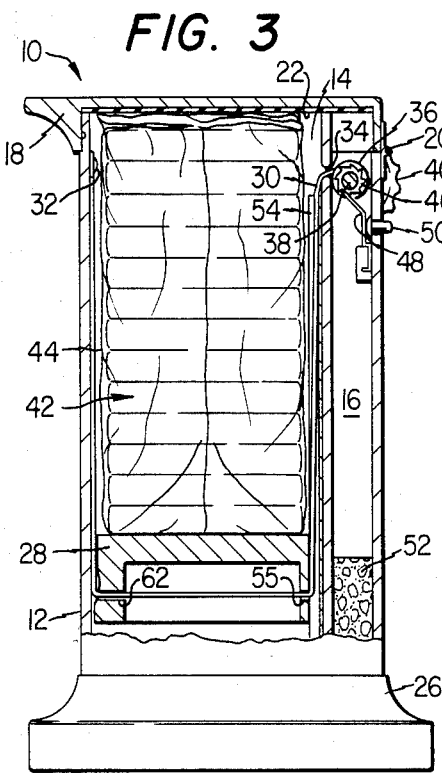
FIG. 3 illustrates a cross-sectional view of the food dispenser with the lid closed and bread contained therein.

Referring now to FIG. 1, there is illustrated a perspective view of a food dispenser 10 of the present invention. Food dispenser 10 includes a lower housing 12 that has a receiving chamber 14 for the food products and an auxiliary chamber 16 disposed adjacent the receiving chamber 14. A lid 18 is attached to the lower housing 12 on one edge of the auxiliary chamber 16 by a breakover hinge 20. The hinge 20 is connected to one edge of the lid 18 such that rotation about the axis of the hinge 20 allows the lid to be raised or lowered. The breakover hinge 20 allows the lid to assume two positions, a first position with the lid 18 orthogonal to the opening and a second position with the lid 18 closed. An important aspect of the present invention, is that the breakover hinge 20 provides a slight downward force in addition to the force of gravity to maintain the lid 18 in tight communication with the top of the lower housing 12.

A gasket 22 is disposed on the interior lower side of the lid 18 to coordinate with a peripheral edge or rim 24 of the receiving chamber 14. The gasket 22 provides a sealing function to minimize air flow between the outside environment and the interior of the receiving chamber 14.

The lower housing 12 is supported on a base 26 for allowing the housing 12 to stand upright. It should be understood that for the exemplary embodiment of the present invention the housing 12 can be supported at up to a 45° angle with the normal to the base 26 and still operate, as will be described hereinbelow.

A reciprocating platform 28 is disposed in the receiving chamber 14 for slideable movement therein. The platform 28 is operable to reciprocate within the chamber 14 to raise and lower the food products disposed therein. In this manner, a variable volume is provided such that removal of a portion of the food product, such as slices of bread, can be compensated for by raising the platform 28.

A nylon cord 30 is attached to one edge of the upper rim 24 of the receiving chamber 14 at an attachment point 32 and extends under the platform 28, the interaction of which will be described hereinbelow, and then through an orifice 34 disposed in the rear wall of the receiving chamber 14. The cord 30 is attached to a pulley 36 and wound thereabout. The pulley 36 is fixedly attached to a shaft 38 which is disposed in the upper end of the auxiliary chamber 16 through the sides thereof (not shown). A knob 40 is attached to the end of the shaft 38 disposed through the side of the housing 12 and is operable to manually rotate the shaft 38 in either direction. It should be understood that the knob 40 can be disposed on either side of the shaft 38.

The interior portion of the receiving chamber 14 is fabricated from a plastic material by injection molding techniques and the platform 28 is also manufactured in a similar manner. However, the platform 28 can be machined from a plastic-like material manufactured by E. I. Dupont DeNemours & Co. under the trademark CORIAN. Plastic or a similar type of material is utilized to provide an anticorrosive surface that provides a minimum coefficient of friction between two sliding surfaces. This allows the platform 28 to reciprocate within the receiving chamber 14 with minimal binding thereof. Since a platform or a similar planar surface shows a tendency to wedge when urged along the longitudinal axis of a tubular member, it is necessary to reduce binding on the sides thereof in addition to distributing the driving forces evenly.

The platform 28 is fabricated with the requisite amount of weight to provide self-lowering when the cord 30 is unwound from the pulley 36. However, for a platform 28 that is manufactured with a much tighter fit to the receiving chamber 14, manual force may be necessary to lower the platform within the receiving chamber 14 to insert additional food products therein. To raise the platform 28 from a retracted position within the chamber 14, it is only necessary to turn the knob 40 to wind the cord 30 on the pulley 36 thereby urging materials contained in the receiving chamber 14 toward the rim 24.

Referring now to FIG. 2, there is shown a perspective view of the embodiment of FIG. 1 with a loaf of bread 42 disposed in the receiving chamber 14. The loaf of bread 42 has a cellophane wrapper 44 disposed thereabout which is the normal packaging technique therefor. The cellophane wrapper 44 is illustrated as being open and standing upright. Normally, the cellophane wrapper has a small wire tie disposed thereabout to constrict the cellophane and reduce the air flow to the bread contained therein. When this wire tie is removed, the cellophane expands to its normal tubular conformation thereby allowing the slices of bread to be easily removed. As will be described hereinbelow, the knob 40 can be incrementally rotated to "dial" the number of slices desired, the number of slices dialed then appearing above the rim 24.

Referring now to FIG. 3, there is illustrated a cross-sectional view of the food dispenser 10 of FIG. 1 with the lid 18 closed and the receiving chamber 14 having the loaf of bread 42 contained therein and resting on the platform 28. The shaft 38 has a ratchet wheel 46 disposed thereon. A spring type ratchet lever 48 is mounted on one of the vertical sides of the auxiliary chamber 16 and coordinates with the ratchet lever 48 to prevent rotation thereof in one direction only. Free rotation is allowed in the opposite direction, which is the direction of rotation for raising the platform 28. The ratchet is segmented such that an audible "click" occurs for each portion of a revolution thereof. This audible click is designed to indicate to the person operating the food dispenser 10 the number of slices of bread being dialed. For example, if an operator desires to retrieve three pieces of bread, the knob 40 need only be turned in the proper direction three clicks of the ratchet wheel 46. A release button 50 is disposed adjacent the ratchet lever 48 and extending through the exterior wall of the auxiliary chamber 16 to allow manual release of the ratchet wheel 46 to allow retraction of the platform 28 into the receiving chamber 14.

To facilitate reciprocal motion of the platform 28 within the receiving chamber 14, a guide 54 is disposed on the vertical wall between the chambers 14 and 16 through which the cord 30 is passed. The guide 54 prevents canting of the platform 28 from side to side thereby "wedging" the platform 28 into the receiving chamber 14. The cord 30 is passed through an orifice 55 through one side of the platform 28 adjacent the guide 54 to the other side of the platform through an orifice 62. The orifices 55 and 62, due to the sliding of a nylon cord on a plastic surface, function as bushings.

In an important aspect of the present invention, the knob 40 is rotated to urge the platform 28 against the loaf of bread 42 such that the bread is thereby compressed against the lid 18. The cellophane wrapper 44 is normally hand twisted such that it is compressed between the bread and the lid. In this manner, the amount of air disposed within the interstices of the bread is thereby reduced. In this manner, the volume of air that is available for evaporation of moisture from the bread itself is reduced. This extends the life of a loaf of bread in storage. To accomplish the compression of the bread, the lid is either closed with two to three slices extending above the rim 24 or the knob 40 is rotated a nominal number of degrees after the lid is closed to thereby compress the bread.

To further decrease moisture escape from the bread, a sponge 52 is disposed in the auxiliary chamber 16 to absorb water supplied from an external source. The water contained in the sponge 52 provides a high level of humidity within the auxiliary chamber 16. Although not shown, additional slots can be disposed between the wall separating the auxiliary chamber 16 and the receiving chamber 14 to allow the humidity in both chambers to equalize. However, the orifice 34 does allow some communication between the two chambers. In addition, the chamber can be partially filled with water without requiring the sponge 52.

Figure 4:
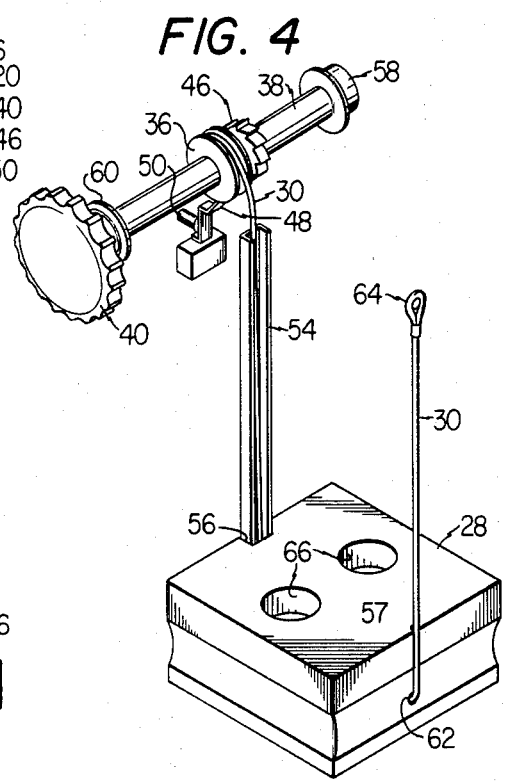
FIG. 4 illustrates a detail of the pulling mechanism and the platform.

Referring now to FIG. 4, there is shown a detail of the shaft 38 with the mechanisms associated therewith, the guide 54, the platform 28 and the cord 30. The shaft 38 is captured at one end by a blind bushing 58 and at the other end by a through bushing 60 that is disposed in an appropriate hole in one of the exterior walls of the housing 12 bordering the auxiliary chamber 16. The cord 30 passes through the slot 56 in the platform 28 through the guide 54 and through a hole (not shown) in the side of platform 28 to pass through the platform 28 and exit through the orifice 62 disposed in the opposite side of the platform 28. Since, as described above, the platform 28 is fabricated of a plastic type material, the orifice 62 functions as a bearing or bushing to allow the nylon cord 30 to freely pass therethrough. After passing through the orifice 62, the cord 30 is passed through a vertical slot 57 in the side of the platform 28 to provide the cord 30 with a guide. The end of the cord 30 is terminated with an eyelet 64 for attachment to the attachment point 32. Finger holes 66 are disposed in the top of the platform 28 to allow manual retraction of the platform 28 from the receiving chamber 14 for sanitary purposes.

The pulley 36 is designed such that the interior walls thereof are approximately twice the thickness of the nylon cord 30. For example, in a preferred embodiment, the nylon cord is 1/16th of an inch in diameter and the distance between the inner walls of the pulley 36 is slightly larger than ⅛th of an inch. In this manner, winding of the cord 30 on the pulley 36 results in "stacking" of the cord between the walls of the pulley rather than lateral movement across the surface of the pulley. Therefore, lateral movement of the cord 30 is restricted such that the cord can be fed through the orifice 34 without incurring a large amount of friction on the sides thereof.

Figure 5:
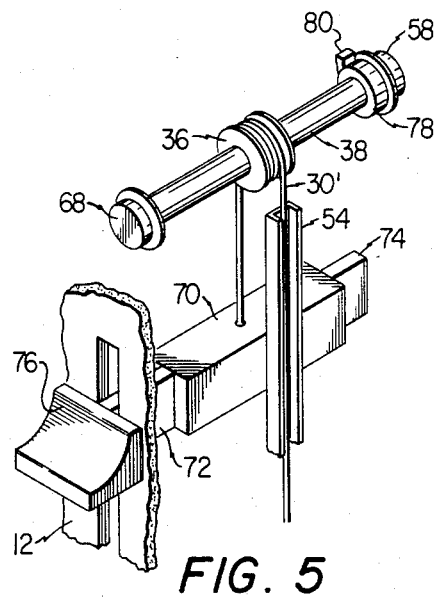
FIG. 5 illustrates an alternate embodiment of the pulling mechanism.

Referring now to FIG. 5, there is illustrated an alternate embodiment of the mechanism to retract the platform 28 from the receiving chamber 14. The shaft 38 is held in place within the auxiliary chamber 16 on one end by the blind bushing 58, as described above, and on the other end thereof by a blind bushing 68. A cord 30', slightly longer than the cord 30, is wound with one revolution about the pulley 36 and attached on the other side of the pulley 36 to a reciprocating bar 70. The reciprocating bar 70 has a guide bar 72 disposed on one end and a guide bar 74 disposed on the other end thereof for movement within two slots (not shown) disposed through the exterior walls on either side of the auxiliary chamber 16. A push knob 76 is disposed on the end of the guide bar 72 to allow manual reciprocation of the reciprocation bar 70. The push knob 76 is external to the auxiliary chamber 16 and the housing 12.

The reciprocating bar 70 is counterweighted to equal the weight of the platform 28 plus the food products disposed thereon. A bushing 78 is disposed on the shaft 38 for frictional rotation therearound. A wedge 80 is disposed adjacent the bushing 78 and adjacent the outer wall of the auxiliary chamber 16. The wedge 80 is operational to distort the bushing 78 to increase the friction of the bushing 80 on the rod 38, thereby introducing rotational friction therebetween. In this manner, rotation of the shaft 38 is somewhat restricted such that a greater force is required to rotate it in either direction.

Figure 6:
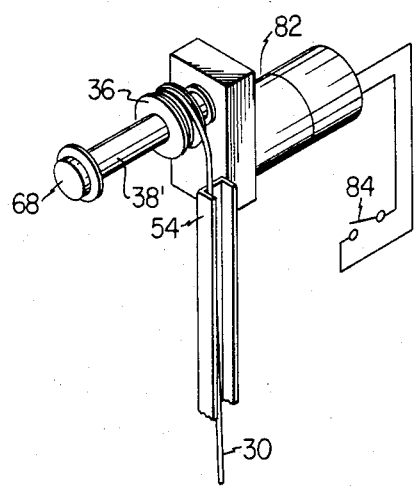
FIG. 6 illustrates an alternate embodiment of the pulling mechanism with an electric motor for driving the shaft.

Referring now to FIG. 6, there is illustrated yet another embodiment of the driving mechanism for reciprocating the platform 28 within the receiving chamber 14. A shaft 38' has one end thereof supported for rotation in the blind bushing 68 and the other end thereof connected to a reduction gear electric motor 82 for rotation thereof. The pulley 36 is attached to the shaft 38' for rotation therewith. A switch 84 is operable to activate the motor 82 and is disposed on the external wall of the housing 12. The dimensions of the electric motor 82 are such that the electric motor will insert into the auxiliary chamber 16. The electric motor 82 is geared such that it will produce approximately 4 to 6 revolutions per minute depending upon the desired feed rate for the food products stored in the receiving chamber 14.

Figure 7:
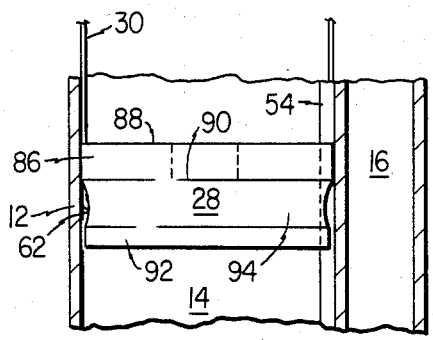
FIG. 7 illustrates a cross-sectional view of the platform.

Referring now to FIG. 7, there is illustrated a side view of the platform 28 disposed in the receiving chamber 14. The platform 28 consists of an upper plate 86 which has an upper rectangular edge 88 and a lower rectangular edge 90. The upper plate 86 is solid between the edges 88 and 90 and the perimeter of the edge 88 is slightly larger than the perimeter of the edge 90. This provides a slight upward and outward taper for the sides of the upper plate 86. There is approximately a 0.01 inch inward taper from the edge 88 to the edge 90. This allows the upper edge 88 to be pressed into the receiving chamber 14 with some expansion provided for.

The lower portion of the platform 28 is comprised of a lower rectangular rim 92 and a spacer 94 disposed therebetween. The perimeter of the lower rectangular rim 92 is smaller than the perimeter of the upper rectangular plate 86. The dimensions are such that there is approximately 1/32nd of an inch between the sides of the lower rectangular rim and the sides of the interior surface of the receiving chamber 14. The spacer 94 has a perimeter that is smaller than both the plate 86 or the rim 92 such that the spacer 94 does not contact the sides of the chamber 14.

In operation, the platform 28 is press fit into the receiving chamber 14 with the upper edge 88 slightly compressed. The cord 30 is passed through the guide 54 and through a hole in the side of the spacer 94. The cord passes through the spacer 94 to exit the orifice 62 and extend up the opposite side. The spacer 94 is hollow such that the cord 30 passes through a wall on each side. This allows the force distributed to the platform 28 to be evenly distributed on either side thereof.

When the cord is tightened, the force disposed on each side of the platform at the bending points of the cord 30 in the walls of the spacer 94 causes an upward reciprocal movement of the platform 28. If, for some reason, slight friction is encountered on one side of the platform 28, the resulting "restricting" force allows the other side to proceed ahead and thereby cant the platform 28. This canting can result in "jamming" of the platform 28. However, the lower rectangular rim 92 contacts the side of the receiving chamber 14 to provide an opposing force to prevent "wedging" of the platform 28 by redistributing the forces. In this manner, a more even reciprocation of the platform 28 is provided within the chamber 14.

In order to more centrally locate the urging force applied to the bottom of the platform, the bottom of the platform can be "V" shaped such that the cord 30 is disposed along the bottom of the platform. In this manner, the force is directed at an angle to the surface of the platform and towards the center thereof. This results in a force vector directed away from the vertical walls of the receiving chamber 14 which further prevents canting of the platform.

Figure 8:
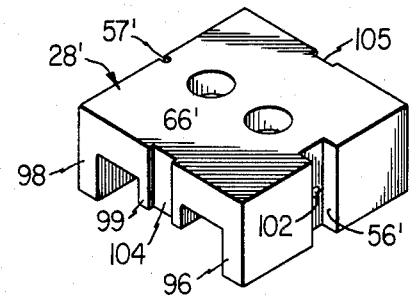
FIG. 8 illustrates a perspective view of an alternate embodiment of the platform.

Referring now to FIG. 8, there is shown a platform 28' which is an alternate embodiment of a platform 28 of FIG. 7. The platform 28' has two vertical sides 96 and 98 and a reinforcing support 99 disposed under the surface thereof. Two finger holes 66' are disposed at the top of the platform 28' and a guide slot 56' for coordination with the guide 54 is disposed in the vertical side 96 with an orifice 102 disposed in the slot 56' to allow the cord 30 to pass therethrough. A slot 57' is disposed in the vertical side 98 for allowing the cord 30 to exit therefrom on the opposite side from the orifice 102. Additional guides 104 and 105 are provided on either side of the platform 28 adjacent the vertical sides of the chamber 14. The platform 28' is designed to slideably move within the chamber 14 without forming a press fit therewith. In this manner, gravity can be utilized to retract the platform 28' within the chamber 14.

Figure 9:
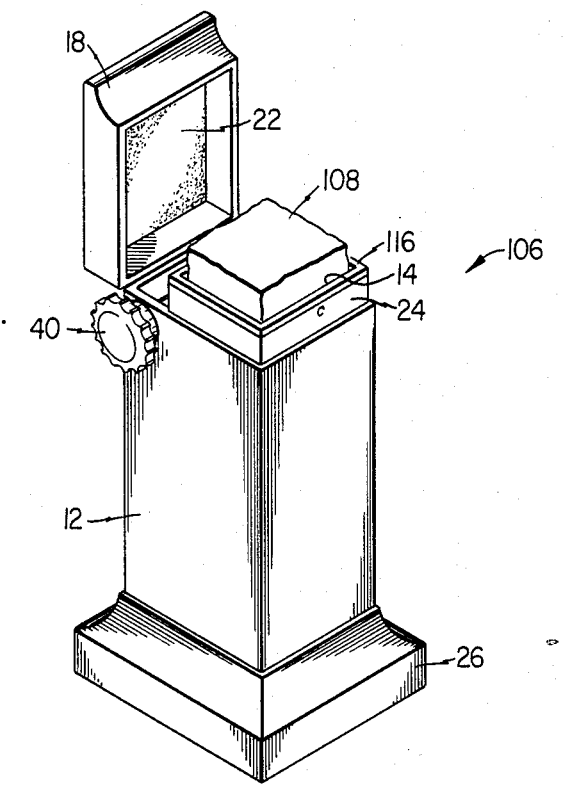
FIG. 9 illustrates a perspective view of an alternate embodiment of the food dispenser of the present invention for use with products such as butter.

Referring now to FIG. 9, there is illustrated an alternate embodiment of the food dispenser 10 of FIG. 1 wherein like numerals refer to like parts in the various figures. In the preferred embodiment, a dispenser 106 is shown with a stick of butter 108 disposed in the receiving chamber 14. In addition, there is illustrated a metal insert 110 disposed on the rim 24 of the housing 12. This metal rim functions as a screed and facilitates trimming of a portion of the butter 108 with a knife or some similar hard cutting apparatus. The metal rim can be fabricated of such materials as stainless steel or some other noncorrosive material.

The food dispenser 106, in the preferred embodiment, utilizes the platform 28 of FIG. 7. In addition to providing a dispensing function, the platform 28 also provides a cleaning function of the sides since the upper edge 88 of the platform 28 is in such close contact with the vertical sides of the chamber 14.

In summary, a food dispenser has been described that stores and dispenses perishable food products. A platform is disposed in a receiving chamber to reciprocate therein to selectively raise food products such as a loaf of bread, to a desired height for retrieval of the individual slices therefrom. A lid mounted on a breakover hinge covers the remaining portion of the bread with a gasket therebetween to form an airtight seal. The resulting airtight chamber minimizes the escape of moisture from the bread in addition to compressing the bread to reduce the air volume in the interstices of the bread. A cord disposed around the platform and attached at one end thereof to one edge of the opening in the housing and at the other end thereof to a pulley disposed on the shaft is operable, upon winding about the shaft, to raise the platform in the receiving chamber and dispense the food. The shaft can be incrementally advanced by knob through manual control or with a electric motor to dispense predetermined portions of the food products such as bread or butter.

Although the preferred embodiment has been described in detail, it should be understood that various changes, substitutions and alterations can be made herein without departing from the spirit and scope of the invention as defined by the appended claims.

What is claimed is:

1. An apparatus for storing and dispensing perishable food products, comprising;
    a semi-airtight container with a hollow interior having:
        a lower cuboidal shaped housing with an opening on one end thereof,
        a rectangular lid for disposal over said opening,
        a gasket disposed on said lid between said lid and said housing, and
        a breakover hinge attached to one edge of said lid and one edge of the opening on said lower housing for rotation of said lid thereon, said breakover hinge providing a closing force when said lid is mated to said opening on said lower housing;
    platform means slideably disposed with said airtight container for defining a variable volume therein for receiving and containing the food products, said platform means having a planar side disposed parallel to the opening in said container; and
    motive force means for applying a distributed force to the side of said platform means opposite the opening on said container to selectively urge said platform means toward said opening to dispense the food products contained in said variable volume and away from said opening for storing said food products, the platform being maintained at a position during storage and when the lid is closed so that said variable volume is maintained essentially equal to the volume of the remaining food products:
    said motive force comprising:
        an auxiliary chamber adjacent the hollow interior of said container;
        a shaft disposed in said chamber and rotatably mounted on the exterior walls of said container;
        a cord having one end thereof connected to one edge of the opening in said container and extending down the vertical side of the interior of said container diametrically opposite said auxiliary chamber, around the end of said platform means opposite said opening and extending up the vertical side of said container adjacent said auxiliary chamber to attach to said shaft for winding thereabout such that rotation of said shaft winds said cord about said shaft to thereby urge said platform means toward said opening; and
        means for rotating said shaft.

2. The apparatus of claim 1 wherein said lower housing and said lid are fabricated from injection molded plastic.

3. The apparatus of claim 1 wherein said platform means comprises a cuboidal shaped member having a planar surface and four rectangular sides, said platform slideably fitting in said lower housing.

4. The platform of claim 3 further comprising finger holes disposed through the surface of said platform to allow manual retraction of said platform for sanitary purposes.

5. The apparatus of claim 1 wherein said platform means comprises:
    an upper rectangular surface having four rectangular sides, said surface parallel to the opening in said container, said rectangular sides forming a press fit with the sides of said container;
    a lower rim disposed beneath said upper surface and the rectangular sides thereof, the perimeter of said lower rim smaller than the perimeter of said upper surface to provide a sliding fit with the sides of said container; and
    a space disposed between said upper surface and said lower rim to place a defined distance therebetween wherein said lower rim prevents canting of said upper surface by increasing the lateral force on one of the edges thereof that exhibits a tendency to cant thereby distributing the force to the diametrically opposite side.

6. The apparatus of claim 1 wherein said means for rotating comprises a knob for manual rotation of said shaft.

7. The apparatus of claim 1 wherein said means for rotating comprises an electric motor.

8. The apparatus of claim 1 further comprising means for incrementing said means for rotating to allow incremental rotation thereof.

9. The apparatus of claim 1 wherein said means for rotating comprises a counterweighted cord having one disposed around said shaft in the opposite rotational direction from said nylon cord and the other end of said counterweighted cord connected to a counterweight, said counterweight connected to a reciprocating lever to reciprocate said counterweight parallel to the vertical sides of said lower housing such that reciprocation of said reciprocating lever rotates said shaft to urge said platform means toward said opening.

10. The apparatus of claim 1 further comprising for guiding said platform means along the vertical sides of said lower housing.

11. An apparatus for storing and serving perishable food products, comprising:
   a semi-airtight container with a hollow interior having:
      a lower cuboidal housing with a base, four vertical sides and an opening at one end thereof,
      a rectangular lid disposed over said opening,
      a gasket disposed on said lid between said lid and said housing, and
      a breakover hinge attached to one edge of said lid and one edge of said opening for rotation of said lid thereon, said breakover hinge providing a closing force when said lid is mated to the opening on said lower housing;
   a reciprocating platform disposed in the hollow interior of said container for defining a receiving volume for the food products, said platform movable within the hollow interior of said container along an axis perpendicular to the plane of said opening, said platform having:
      an upper rectangular plate with the sides thereof disposed adjacent the vertical sides of the hollow interior of said container to form a press fit therewith,
      a lower rim having the sides thereof adjacent the vertical sides of said container and disposed on the opposite sides of said plate from said opening to form a sliding fit with respect to the vertical sides of said container, and
      a spacer disposed between said rim and said plate to provide a finite distance therebetween such that the canting of said plate causes one side of said rim to provide a counteracting force thereto;
   an auxiliary chamber disposed adjacent the hollow interior of said semi-airtight container and in communication therewith, said chamber extending along one of the vertical sides of said container;
   means for providing moisture to said auxiliary chamber for maintaining humidity in said chamber and said container;
   a shaft disposed in said container, adjacent and parallel to one edge of said opening in said container, the ends of said shaft rotatably mounted on the exterior walls of said chamber;
   a nylon cord having one end thereof connected to an attachment point on the edge of said opening diametrically opposite said shaft, said cord running from said attachment point along the vertical side through an opening disposed in said space on said platform and running therethrough to a second hole disposed on the other side of said spacer and running up the vertical side opposite said one vertical side and attached to said shaft for winding thereabout; and
   a knob attached to said shaft for manual rotation thereof.

* * * * *